United States Patent [19]

Heinze et al.

[11] 4,301,275
[45] Nov. 17, 1981

[54] PROCESS AND DEVICE FOR CONTINUOUSLY TREATING WITH GASES AQUEOUS DISPERSIONS OF POLYVINYL CHLORIDE

[75] Inventors: Christoph Heinze, Burghausen; Franz Bötsch, Burgkirchen-Holzen; Horst Wolff, Neuötting, all of Fed. Rep. of Germany

[73] Assignee: Hoechst Aktiengesellschaft, Fed. Rep. of Germany

[21] Appl. No.: 151,404

[22] Filed: May 19, 1980

Related U.S. Application Data

[63] Continuation of Ser. No. 902,866, May 4, 1978, abandoned, which is a continuation of Ser. No. 683,471, May 4, 1976, abandoned.

[30] Foreign Application Priority Data

May 9, 1975 [DE] Fed. Rep. of Germany ....... 2520591

[51] Int. Cl.³ ............................. C08F 6/24; C08F 6/16
[52] U.S. Cl. ........................... 528/500; 260/29.6 PT; 422/225; 528/483; 528/502

[58] Field of Search ............. 528/480, 483, 500; 260/29.6 PT

[56] References Cited

U.S. PATENT DOCUMENTS

| | | | |
|---|---|---|---|
| 3,622,553 | 11/1971 | Cines | 526/344 |
| 3,926,927 | 12/1975 | Stookey | 159/48 R |
| 3,956,249 | 5/1976 | Goodman | 528/500 |

FOREIGN PATENT DOCUMENTS

| | | | |
|---|---|---|---|
| 1248943 | 8/1967 | Fed. Rep. of Germany | 528/499 |
| 2162860 | 7/1972 | Fed. Rep. of Germany | 528/500 |

*Primary Examiner*—C. A. Henderson
*Attorney, Agent, or Firm*—Connolly and Hutz

[57] ABSTRACT

In aqueous dispersions on the basis of polyvinyl chloride the content of residual monomers is reduced by the countercurrent method by contacting the rapidly moved surface of the dispersion with secluded intensely mixed gas atmospheres in several successive chambers. To carry out the process a device is used which permits to obtain under mild conditions residual monomer contents of 10 ppm and therebelow.

8 Claims, 3 Drawing Figures

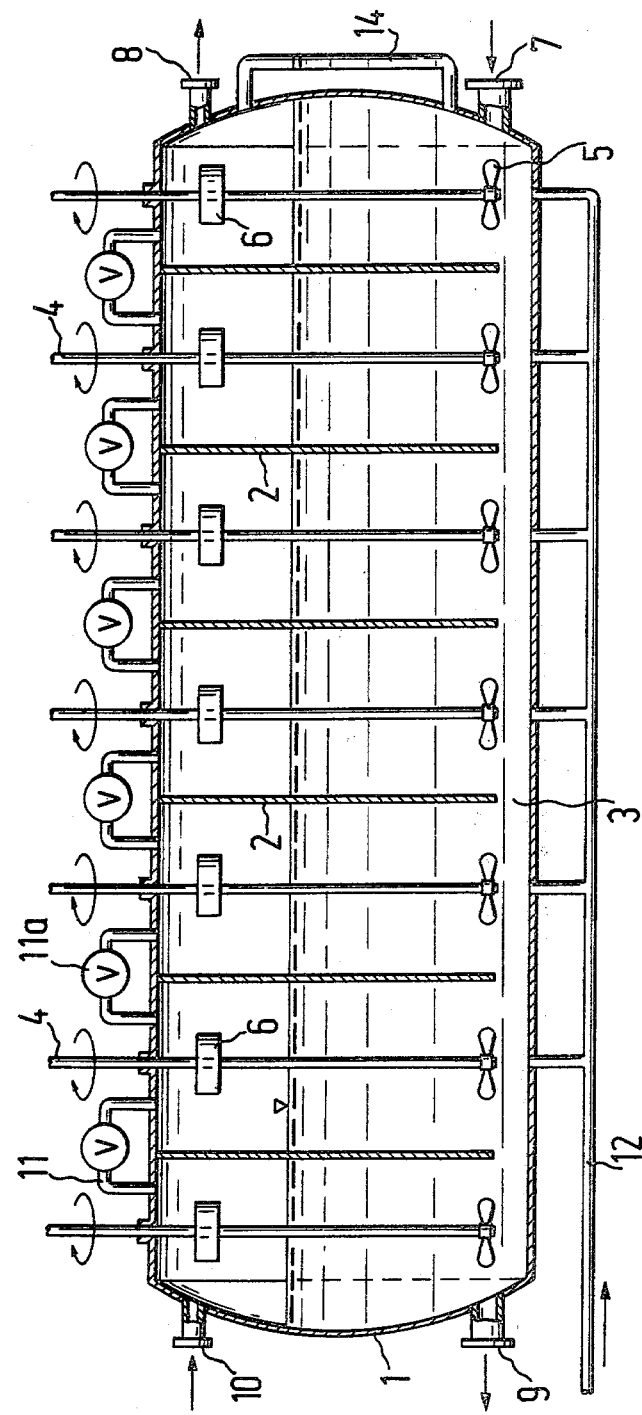

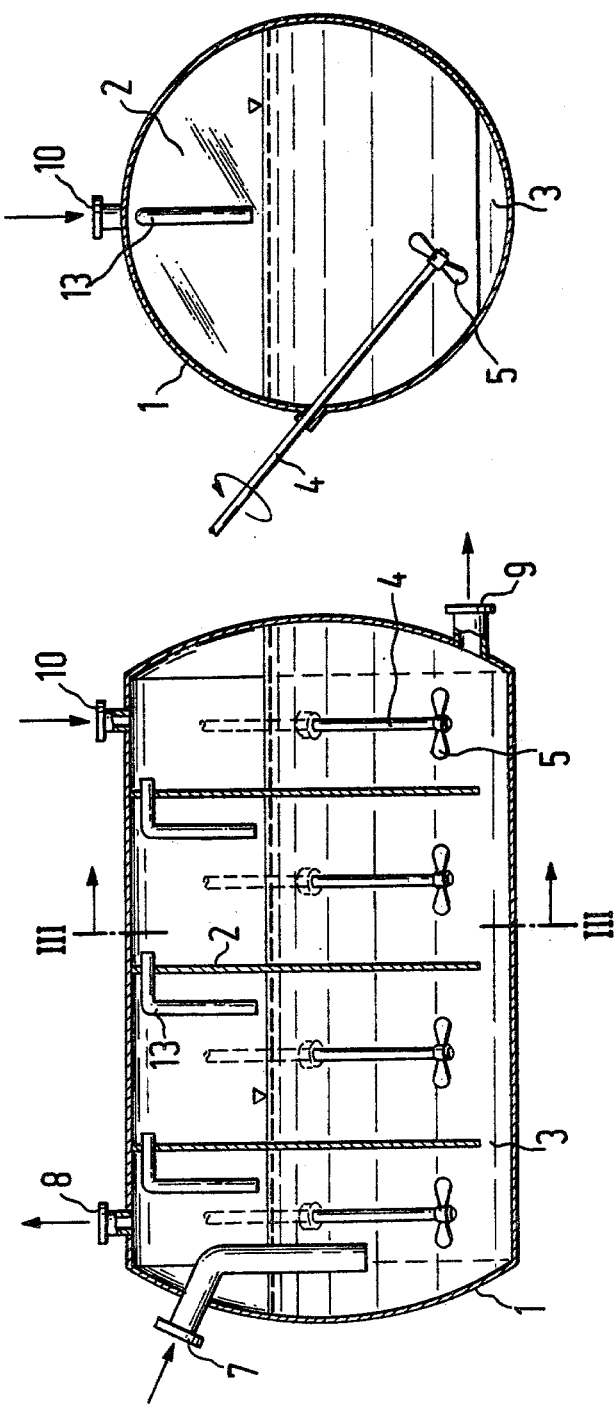

PROCESS AND DEVICE FOR CONTINUOUSLY TREATING WITH GASES AQUEOUS DISPERSIONS OF POLYVINYL CHLORIDE

This application is a continuation of application Ser. No. 902,866 filed May 4, 1978 now abandoned which is a continuation of application Ser. No. 683,471 filed May 4, 1976 now abandoned.

BACKGROUND OF THE INVENTION

1. Field of the Invention

This invention relates to a process wherein the rapidly moved surface of an aqueous dispersion on the basis of polyvinyl chloride is contacted in a plurality of successive chambers, in each chamber with a secluded intensely mixed gas atmosphere, the gas being transported from one chamber to the next one in one direction and the dispersion being transported in the opposite direction. The invention also relates to a device suitable to carry out the said process and comprising a horizontal cylindrical vessel divided into chambers by partition walls in vertical position relative to the cylinder axis, an inlet and an outlet for the dispersion, an inlet and an outlet for the gas and at least one stirrer in each chamber.

Plastics dispersions as obtained by homopolymerization, copolymerization or graft polymerization of vinyl chloride (VC) in aqueous emulsion or suspension or by subsequent dispersion of the finished polymer often contain volatile constituents, especially unreacted monomers, the removal of which is desirable for various reasons.

These volatile constituents may detrimentally effect the processing properties of the dispersions or of the solid powders obtained therefrom, as well as the properties of the products made therefrom. For example, bubbles may be formed, the material may have an unpleasant odor, the mechanical properties may be deteriorated and the thermostability reduced. It is especially important to remove as far as possible volatile constituents which are physiologically noxious or unhealthy. In this case, the volatile constituents should be removed without injurious emission into the environment.

Physiologically hazardous, readily volatile constituents are often the unreacted monomers, especially vinyl chloride (VC), the content of which in the polymer should not exceed 10 ppm as a result of more recent discussions about possible official regulations.

2. Description of the Prior Art

Various processes are known to remove volatile constituents from plastics dispersions by treating them with gases, especially with steam.

It has been proposed to free the polymer dispersion from monomers by passing through steam or inert gases. For this purpose considerable amounts of steam or gas are required which cause troubles, above all with polymer dispersions tending to foam. The addition of anti-foaming agents renders the process more expensive, it is not always effective and may detrimentally affect the properties of the dispersion. To avoid the difficulties, it has been proposed to destroy the foam formed during the passage of steam or inert gases by rapidly reducing the pressure at steam velocities of more than 100 m/sec, to separate the steam from the broken foam and to recycle the latter into the boiling dispersion. The process is carried out continuously and requires a high amount of steam.

In another known process the dispersion is mixed in a tube with steam or hot inert gases and the formed three-phase mixture is separated shortly thereafter into dispersion and gaseous phase. It has also been proposed to atomize polymer dispersions in steam flowing at a high speed, to pass the mixture obtained between heated plates into a release zone where the dispersion is separated from the gaseous phase in a cyclone. A further known process is carried out in analogous manner, the aqueous dispersion and the stripping gas are injected into a contacting tube substantially without contraction, in which tube the vaporous mixture of dispersion and stripping gas travels at a high speed. The mixture is then passed through a nozzle into a further contacting tube without contraction and finally discharged into a separating chamber at reduced pressure. The three latter processes are carried out in continuous manner but all require high amounts of steam. In spite of the high velocity of flow the dispersion may be superheated, coagulations may occur and the polymer may cake on the apparatus walls. Moreover, monomers included in the polymer core, which require a certain time of diffusion, are removed very incompletely only.

In another known process the dispersion is conducted in a column in countercurrent flow to a steam current. In this case, too, foaming may occur with a high throughput of dispersions of low surface tension and deposits of solids may easily clog the apparatus.

It has also been proposed to spray the dispersion into a steam atmosphere in such a manner that the sprayed particles fall through the steam owing to gravity. For this purpose a large and relatively expensive vessel is required.

In a further known process the plastics dispersion is treated in parallel or countercurrent flow in a trickling absorber with an inert gas current at a temperature of from 40° to 100° C. For a substantial removal of volatile substances down to a few ppm (calculated on the dispersion) the throughput must be kept relatively small or a large apparatus is required. The tubes of the absorber may easily narrow or clog by increasing deposit formation, especially with dispersions with settling tendency of the dispersed matter, so that capacity and heat transition are reduced. With the high amounts of gas required the recovery of volatile constituents from the inert gas is difficult and expensive. On the other hand, with physiologically objectionable volatile substances an emission of the inert gas containing same is to be avoided for reasons of environmental protection.

Finally, a device has been proposed to expel solvent residues from polymer dispersions by steam distillation consisting of a horizontal vessel provided with vertical weirs. The dispersion is supplied at one end of the vessel and travels from one compartment to the other by overflowing the weirs. Each compartment of the vessel is equipped with a multistage-impulse-countercurrent stirrer and has a steam inlet at the bottom. The steam flows through the dispersion and is discharged, together with the expelled solvent, from a common gas space in the upper section of the vessel. After having passed all weirs in the vessel the dispersion is discharged.

This device is little suitable for removing volatile constituents from plastics dispersions with tendency to settle of the dispersed particles with possible formation of a layer on the bottom which cakes in permanent contact with the steam blown in and may clog the inlet opening. When steam is blown through dispersions tending to foam, difficulties may arise by the formation of foam. In order to remove the volatile constituents as completely as possible, long residence times and a relatively high consumption of steam are required. The recovery of such constituents, which must not be emitted into the atmosphere, is rendered difficult owing to the high amount of carrier gas. In the case of dispersions, which are sensitive to elevated temperatures, prolonged residence times may cause damages. The liquid level in the vessel is fixed by the weirs and thus the residence time with a constant volume flowing through. The multistage-impuls-countercurrent stirrer is suitable to produce a laminar flow and developed for low circumferential speeds. In the turbulent range high efficiencies of revolution cannot be achieved.

SUMMARY OF THE INVENTION

The present invention provides a process which does not have the aforesaid disadvantages. It is a process for continuously treating aqueous dispersions, the polymer proportion of which contains at least 50% by weight of polymerized vinyl chloride, in several successive chambers with gases, wherein the gas spaces of the chambers are secluded with respect to one another and in each chamber the gas is intensely mixed, the gas is transported from one chamber to the next one in one direction only, while the dispersion is passed from one chamber to the next one in opposite direction, and in the chambers the dispersion is rapidly moved on the surface by suitable means in the direction of the surface of contact between the phases of dispersion and gas.

The present process is based on the observation that volatile constituents can be continuously removed from a dispersion, especially a dispersion on the basis of polyvinyl chloride, in a more rapid and complete manner when the dispersion is treated with gas successively in secluded chambers and care is taken that in the unit of time as large as possible a surface area of the dispersion is contacted with the gas within one chamber while intensely mixing the gas to avoid differences in concentration.

The rapid motion of the surface of the dispersion in the direction of the boundary surface between the phases ensures the contact of a large surface area of the dispersion with the gas space and, hence a more rapid adjustment of the equilibrium between the concentration of the volatile constituents in the liquid and their concentration in the gas space of an apparatus of relatively small volume. A motion of the surface of the dispersion in vertical direction with respect to the boundary surface between the phases, as occuring, for example, on blowing steam or other gases through the dispersion, should be avoided as far as possible as it may cause the formation of foam, impair the adjustment of the equilibrium and trouble the course of the process. The surface of the dispersion should flow as smoothly as possible but rapidly.

DESCRIPTION OF THE PREFERRED EMBODIMENTS

On the surface the dispersion should have a speed in the direction of the boundary surface between the phases of at least 0.1, preferably 0.3 to 10 m/sec. At a speed below 0.1 m/sec the desired expelling effect of the volatile constituent (referred to in the following as degassing effect) is obtained only with an apparatus having large uneconomical dimensions. With a speed above 10 m/sec the smoothness of the surface becomes critical, foam may be formed and coagulations may occur. Especially good results are obtained at a speed of from 0.5 to 2 m/sec.

The surface of the dispersion is preferably kept in motion by stirrers causing an intense flow in the direction of the stirrer axis with formation of a convection current having direction of flow near the wall which is opposite to the direction of flow near the stirrer axis. For this purpose stirring elements as defined below can be used.

In the chambers the stirrers can be mounted with their axes vertically or in an acute angle relative to the surface of the dispersion. The stirring elements should be completely covered by the dispersion. They are preferably mounted in the lower half of the chambers. Especially good results are obtained when they are installed in the lowest fifth of the chamber in order to avoid the aspiration of gas bubbles from the gas space.

The stirring elements are preferably constructed and mounted in such a manner that in each chamber the surface of the dispersion is substantially in radial motion relative to a point on the surface which may coincide with the intersection of the vertical center axis of the chamber with the surface of the dispersion, or may be at a distance from said intersection, which distance could be equal to at most one half of the distance between the inside walls of the chamber in the height of the surface of the dispersion.

The chambers are preferably arranged in one plane one directly beside the other with an opening in the bottom part of the respective partition wall between two adjacent chambers, through which opening the dispersion is transported from one chamber to the other. A deposit of solid matter is avoided by stirring of the dispersion in the chambers and by the permanent flow at the bottom from one chamber to the other.

The opening in the bottom part of the partition wall should preferably have the same size as the cross section of the opening through which the dispersion is introduced into the first chamber in the direction of flow. The opening in the partition wall should have a size of at most 1/5 of the total partition wall to prevent the dispersion from flowing back into the preceding chamber in the direction of flow. Such a backflow would detrimentally affect the degassing effect.

The undesired backflow could also be avoided by running the stirring elements of two adjacent chambers in opposite direction to each other so that in several contiguous chambers the direction of rotation of the stirring elements alternates from one chamber to the other.

Another possibility to deviate the flow produced by the stirrer at the bottom of the chamber in a direction opposite to the flow of the dispersion, is the installation of baffle plates near the openings in the partition walls in the lower part of the respective chamber in such a manner that it does not hit the opening in the partition wall or does hit it in a weakened form.

It proved especially advantageous to provide movable mechanical means on the openings in the partition walls in order to avoid the undesired backflow of the dispersion. Means of this type are, for example, nonreturn flaps which seal the opening in the partition walls when the direction of flow is reversed.

The separation of the gas spaces of the individual chambers from one another is of special importance to the degassing effect. The gas can be introduced separately into each chamber and withdrawn therefrom. In order that as low as possible a gas amount suffices for the treatment, the gas should be conducted in countercurrent flow to the dispersion, while taking care that the gas transport from chamber to chamber takes place in one direction only. This can be achieved, for example, by mounting nonreturn valves in the flow conduits from chamber to chamber or by adapting the cross section of said flow passages to the velocity of flow of the gases in such a manner that a return flow of the gas is substantially avoided.

For this purpose in adjacent chambers an aperture, preferably having an adjustable cross section, can be provided for in the upper part of the partition wall between two chambers.

An intense mixing in the gas space of the individual chambers can be brought about, for example, by allowing the gas to flow from one chamber into the next one at a high speed and producing an eddy current in said chamber, for example, by tangential introduction into a chamber having a circular cross section. A satisfactory mixing in the gas space can also be achieved by introducing the gas at an appropriate flowing speed, for example, over 2 m/sec., in an acute angle and at not too large a distance with respect to the surface of the dispersion. It is preferable to operate with relatively small pressure differences from one chamber to the other and to mix the gaseous phase by mechanical means, for example, as described below, which are suitably driven by the axes used for driving the stirring elements immersed in the dispersion.

An especially good utilization of the gas is obtained when it is supplied to the last chamber in the direction of flow of the dispersion and discharged from the first chamber in the direction of flow of the dispersion. The gas inlet is preferably above the dispersion level.

The treatment of the invention should be carried out in at least two chambers, preferably in 3 to 21 chambers. The degassing effect improves with the number of chambers, but the expenditure pertaining to apparatus increases simultaneously. The expenditure is compensated to a certain extent by the fact that with higher degassing speed with an increasing number of chambers the residence time necessary to obtain a desired low final concentration of volatile constituents (for example <10 ppm of residual VC) diminishes so that a degassing apparatus having smaller dimensions is sufficient. Depending on the initial concentration and the desired final concentration of the volatile constituents, the chosen degassing conditions and the degassing properties of the dispersion, which are defined by the type of polymer, the particle size and the porosity of grain, optimum results are obtained with 5 to about 11 chambers.

Unless the dispersion has a sufficient temperature as a result from its manufacture, it should be heated prior to the treatment with the gas, for example, in a heat exchanger. To compensate heat losses or to adjust predetermined temperatures it may be advantageous to heat the dispersion during the treatment. For example, it could be advantageous to treat the dispersion first at a lower temperature to avoid too rapid an evaporation of the volatile constituents, initially present in a relatively high concentration, which could bring about foaming of the dispersion.

For the supply of heat the individual chambers can be provided, preferably at the bottom, with further gas inlets through which steam for the direct heating by condensation is introduced into the dispersion. A penetration of the steam blown in at the bottom through to the surface of the dispersion should, however, be avoided to hinder an undesired foam formation.

The dispersion can also be heated in the chamber through the walls or by means installed in the chambers provided that they do not disturb or hinder the surface motion of the dispersion.

The treatment of aqueous dispersions on the basis of polyvinyl chloride to remove residual monomers, especially VC, is preferably carried out at a temperature of from 60° to 130° C., more preferably 75° to 110° C., and especially 80° to 100° C.

It may be of advantage to use pressure resistant chambers in order to avoid, for example at a temperature above 100° C., a vigorous boiling of the aqueous dispersion and an undesired vertical motion of the surface of the dispersion relative to the boundary surface of the phases.

For the treatment of the invention all gases which do not react with the dispersion or which do not dissolve under the treating conditions in the dispersion to an undesired extent can be used. The term "gases" is intended to include all substances that are gaseous under the reaction conditions, for example, air, nitrogen, carbon dioxide.

It is especially advantageous to use steam which may be superheated. By condensation of the steam the volatile constituents can be readily isolated in most cases, especially unreacted monomers such as vinyl chloride, and used again in the manufacture of the dispersion, optionally after purification.

The process of the invention can be used for removing volatile constituents from liquids and liquid dispersions, preferably plastics dispersion in which the dispersed particles have a higher density than the dispersion medium, for example, aqueous dispersions in which the dispersed particles have a density above 1 g/ml.

The process is especially suitable for treating dispersions in which the polymer particles contain at least 50% by weight of polymerized vinyl chloride. Very good results are obtained with dispersions containing at least 75% by weight and especially at least 85% by weight, the percentages being calculated on the dry polymer, of polymerized vinyl chloride.

The vinyl chloride homo-, graft- or copolymer dispersion to be treated according to the present invention can be prepared by continuous or discontinuous polymerization processes with or without the use of a seedy polymer. The polymers are prepared in aqueous emulsion or suspension in the presence of from 0.001 to 3% by weight, preferably from 0.01 to 0.3% by weight, calculated on the monomers, of the usual radical forming catalysts, for example, diaryl and diacyl peroxides such as diacetyl, acetyl-benzoyl, dilauroyl, dibenzoyl, bis-2,4-dichloro-benzoyl and bis-2-methyl-benzoyl peroxides; dialkyl peroxides such as di-tert.butyl peroxide; per-esters such as tert.butyl percarbonate, tert.butyl peracetate, tert.butyl peroctoate and tert.butyl perpivalate; dialkyl peroxy dicarbonates such as diisopropyl, diethyl-hexyl, dicyclohexyl and diethylcyclohexyl peroxy dicarbonates; mixed anhydrides of organic sulfoperacids and organic acids such as acetylcyclohexylsulfonyl peroxide; and azo compounds used as polymerization catalysts such as azoisobutyronitrile; and persulfates, for example potassium, sodium and ammonium persulfates; hydrogen peroxide, tert.butyl hydroperoxide and other water soluble peroxides, or mixtures of different catalysts. The peroxidic catalysts can also be used in the presence of from 0.01 to 1% by weight, calculated on the monomers, of at least one reducing substance suitable for the synthesis of a redox catalyst system, for example sulfites, bisulfites, dithionites, thiosulfates, and aldehyde sulfoxylates, for example formaldehyde sulfoxylate. The polymerization can also be carried out in the presence of soluble metal salts, for example of copper, silver, iron or chromium, in amounts of from 0.05 to 10 ppm, calculated as metal on the monomer(s).

The polymerization can also be carried out in the presence of from 0.01 to 1% by weight, preferably from 0.05 to 0.3% by weight, calculated on the monomers, of at least one of the usual protective colloids, for example, polyvinyl alcohols which may contain up to 40 mol % of acetyl groups; cellulose derivatives such as water-soluble methyl cellulose, carboxymethyl cellulose and hydroxyethyl cellulose; gelatin; copolymers of maleic acid or the semi-esters thereof; styrenes, polyvinyl pyrrolidone and copolymers of vinyl acetate and vinyl pyrrolidone.

The polymerization may also be carried out in the presence of from 0.01 to 5% by weight, calculated on the monomers, of one or more emulsifiers. Suitable emulsifiers, which may be used also in admixture with the aforesaid protective colloids and which may be anionic, amphoteric, cationic or non-ionic are, for example, alkali and alkaline earth metal and ammonium salts of fatty acids, for example, of lauric, palmitic or stearic acid, of acid fatty alcohol sulfuric acid esters, paraffin sulfonic acids, alkylaryl sulfonic acids such as dodecylbenzene or dibutyl-naphthalene sulfonic acid, of sulfo-succinic acid dialkyl esters, as well as the alkali metal and ammonium salts of fatty acids containing epoxide groups, such as epoxy-stearic acid, or reaction products of per-acids, for example, per-acetic acid with unsaturated fatty acids such as oleic acid or linoic acid, or unsaturated hydroxyl derivatives of fatty acids such as ricinoleic acid. Suitable amphoteric or cationic emulsifiers are, for example, alkyl betains, such as dodecyl betain, as well as alkyl pyridinium salts such as lauryl pyridinium hydrochloride; and alkyl ammonium salts such as oxethyl dodecyl ammonium chloride. Suitable non-ionic emulsifiers are, for example, partial fatty acid esters of polyhydric alcohols such as glycerol monostearate, sorbitol monostearate, sorbitol monolaurate, oleate, or palmitate, polyhydroxy ethylene ethers of fatty alcohols or aromatic hydroxy compounds, polyethylene esters of fatty acids and polypropylene oxide-polyethylene oxide condensation products.

Besides the catalysts, and optionally protective colloids and/or emulsifiers, the polymerization may also be carried out in the presence of buffer substances, for example, alkali metal acetates, borax, alkali metal phosphates, alkali metal carbonates, ammonia, or ammonium salts of carboxylic acids; and molecular weight regulators, for example, aliphatic aldehydes having from 2 to 4 carbon atoms, chloro- or bromo-hydrocarbons, for example, di- and tri-chloroethylene, chloroform, bromoform, methylene chloride, and mercaptans.

For copolymerization with vinyl chloride one or several of the following monomers can be used; olefins such as ethylene or propylene; vinyl esters of linear or branched carboxylic acids having from 2 to 20 carbon atoms, preferably 2 to 4 carbon atoms, for example, vinyl acetate, propionate, butyrate and 2-ethylhexoate; vinyl-isotridecanoic acid esters; vinyl halides, for example vinyl fluoride, vinylidene fluoride, vinylidene chloride; vinyl ethers; vinyl pyridine; unsaturated acids such as maleic, fumaric, acrylic and methacrylic acid and the mono- and di-esters thereof with mono- and di-alcohols having from 1 to 10 carbon atoms, maleic anhydride, maleic acid imide and the N-substitution products thereof carrying aromatic, cycloaliphatic and possibly branched aliphatic substituents; acrylonitrile, and styrene.

For graft polymerization, elastomeric polymers can be used, which are obtained by polymerizing one or more of the following monomers: dienes, for example, butadiene and cyclo-pentadiene; olefins such as ethylene and propylene; styrene; unsaturated acids such as acrylic and methacrylic acids and the esters thereof with mono- and dialcohols having from 1 to 10 carbon atoms; acrylonitrile; vinyl compounds, for example, vinyl esters of linear and branched carboxylic acids having from 2 to 20 and preferably from 2 to 4 carbon atoms; and vinyl halides such as vinyl chloride and vinylidene chloride.

Suitable processes and polymerization auxiliaries for making the vinyl chloride suspension polymers to be used are described, for example, in "Polyvinylchlorid and Vinylchlorid-Mischpolymerisate" by H. Kainer, Springer Verlag, Berlin/Heidelberg/New York, 1965, pages 12 to 34.

After polymerization further substances can be added to the polymers obtained as aqueous dispersion for stabilization and improving their processing properties. In special cases the usual anti-foaming agents may be added although in the process of the present invention this is normally not necessary.

With the process of the invention aqueous plastics dispersions can be degassed without thermal damage in a relatively short period of time with a relatively low amount of treating gas to a content of residual VC of 10 ppm (calculated on dry polymer) and there below. The process is a continuous one and little liable to troubles. Difficulties by deposits or incrustations on the reactor wall do practically not occur. With the use of readily condensable gases, especially steam, the recovery and re-use of the expelled residual monomers presents no difficulties and requires little expenditure only.

Owing to the fact that the physiologically harmful substances are removed and recovered directly after polymerization injurious emissions into the environmental atmosphere are avoided in a very early stage of the polymer production. The treated dispersion can be further processed by the usual processes, for example, it can be used directly for making coatings, it can be dried by spray drying or contact drying or the main quantity of the aqueous phase can be separated, for example, in a decanter, a centrifuge or a filter and the remaining polymer can be dried in a pneumatic conveying drier. Special safety measures which would require reconstructions or structural additions are not necessary.

The present invention also provides a device for the continuous treatment with gases of aqueous dispersions the polymer proportion of which contains at least 50% by weight of polymerized vinyl chloride, comprising an optionally heatable, horizontal and cylindricyl vessel closed at both ends, at least one partition wall in the interior in vertical position with respect to the cylinder axis and dividing the cylinder into at least two chambers, in each of the chambers a stirrer immersed in the dispersion, an opening each for the supply and the discharge of liquid in each front surface of the cylinder or in the direct vicinity thereof, and openings distributed over the cylinder wall for the introduction and discharge of gases, wherein (a) the partition walls vertical to the cylinder axis close in the upper part at least 4/5 of the entire cross sectional area of the cylinder and reach towards the bottom of the vessel to such an extent that the open area of the cross section in the lower part is at least equal to the cross section of the opening for the supply of liquid into the vessel, (b) in the chambers means are provided which ensure a motion of the surface of the dispersion in the direction of the boundary surface between the dispersion and the gaseous phase at a speed of at least 0.1 m/sec, and (c) in the chambers means are provided to ensure a good mixing of the gaseous phase.

In general, the cylindrical vessel is arranged with horizontal position of the axis although an axis inclined towards the horizontal line is likewise possible.

The openings in the lower part of the partition walls produce a connection through all chambers. The openings may have a size of 1/10 or less of the total cross sectional area of the cylindrical vessel and optionally they may be adjustable in size. The passage in the lower part of the vessel should remain free from offsets so that possible deposits in the dispersion are entrained by the liquid current and transported to the outlet which is preferably in the bottom part of the last chamber. The openings in the partition walls should preferably be at least equal to size to the cross sectional area of the opening through which the dispersion is fed to the first chamber in the direction of flow.

The partition walls are preferably provided with movable mechanical means which autamatically close the openings in said walls when it comes to a backflow of the liquid towards the liquid supply opening or the opening in the front surface of the cylinder. For this purpose nonreturn valves, especially those of an elastic material, for example rubber, can be used.

For cleaning the vessel it is suitably provided with manholes in the upper part and with outlets in the bottom part of the chambers.

The dispersion is advantageously supplied at one end of the vessel at a point below the level of dispersion during operation. The vessel is provided with at least one liquid-level indicator with which the filling height and the average residence time of the dispersion in the vessel can be regulated.

In the upper part the vessel has a gas inlet at least at one end and a gas outlet at the other end.

Furthermore, means are advantageously provided for permitting a gas transport from one chamber to the next one in one direction only, for example, openings in the upper part of the vertical partition walls with nonreturn valves and/or equipments to regulate the size of the cross sectional area of the opening. By the regulation of the cross section the velocity of flow of the gases can be regulated from one chamber to the other in such a manner that a backflow is avoided.

The vessel can also be provided with further gas inlets and outlets distributed over the wall of the vessel in the upper part thereof to introduce and discharge gas into and from the gas space of the chambers, as well as in the lower part of the vessel, for example, for heating the dispersion in the chambers by condensing steam therein.

The vessel is preferably isolated against the dissipation of heat. It may also be provided with means to heat the wall and the partition walls, for example, a jacket with circulating heating agent, circular or semicircular coils or electrical heating elements.

In the cylindrical vessel preferably 2 to 20 and more preferably 4 to 10 vertical walls are mounted.

Means for rapidly moving the surface of the dispersion are preferably stirring elements producing in the liquid apropriate flow conditions, for example, impellers, turbine agitators, turbines with inclined paddles, and paddle mixers.

It proved especially advantageous to use stirrers producing a strong flow in the direction of the stirrer axis, for example, propeller mixers mounted near the bottom of the vessel with downward conveyance. In this manner the aspiration of gas bubbles from the gas space is avoided even with a high efficiency of circulation.

The stirring elements are mounted in the chambers in such a manner that a distance of at most 40% of the internal diameter of the vessel remains between the lower edge of the stirring element and the bottom of the vessel, a distance of 5 to 20% of the internal diameter proved to be advantageous.

The center of the stirring element can be positioned on the vertical axis of each chamber, but it may also have a position such that its center has a distance from the vertical center axis of the chamber of 5 to 40% and preferably 10 to 20% of the internal diameter of the vessel.

To ensure a thorough mixing of the gas phase in the individual chambers steam inlets can be used discharging in a right angle to the surface of the liquid and having a dimension such that the steam issues at a speed of at least 2 m/sec, or axial flow blowers fastened on the stirrer shaft having the same number of rotations as the stirrer and a downward conveying direction onto the surface of the liquid with at least the same and preferably 2 to 4 times the circumferential speed of the stirring element immersed in the dispersion.

To regulate the temperature of the dispersion in the case of trouble the lower gas inlet should have a construction such that in the case of emergency cold water could be introduced into the dispersion, unless separate liquid inlets into the chambers are preferred which could serve to operate in the vessel spraying means for cleaning purposes and prevent the formation of incrustation in the gas space of the chambers.

The device of the invention is suitably connected with the polymerization autoclave with intercalation of a buffer or preheating vessel in which a rough preliminary degassing may be carried out. The dispersion discharged from the device of the invention can be further processed in usual apparatus without pollution of the environment.

It proved to be advantageous to treat the dispersion in a horizontal vessel when it tends to settle and/or stirring in the individual chambers shall be effected with different intensity.

If such conditions do not apply or possibly for spatial reasons the process of the invention can also be carried out in a cylindrical vessel with vertical axis subdivided into individual superposed chambers by horizontal complete partition walls. In this case, the dispersion is preferably transported in downward direction from one chamber to the other by overflows which extend downwardly into the next chamber where they immerse in the dispersion. The gas is transported from the bottom to the top preferably through tubes connecting the gas spaces of the chambers and being mounted either inside or outside of the vessel. To regulate the cross sections of flow of the tubes they are provided with suitable means, optionally in combination with nonreturn valves. The means to move the surfaces of the dispersion and to mix the gaseous phases can be mounted on a common axis extending through the entire vessel. With an apparatus of this kind the expenditure for sealing the passage of the stirrer axis through the horizontal partition walls is, however, much higher than with a horizontal vessel as described before.

BRIEF DESCRIPTION OF THE DRAWINGS

The apparatus in accordance with the invention will now be described by way of example with reference to the accompanying drawing in which FIG. 1 is a longitudinal view of an apparatus according to the invention;

FIG. 2 is a longitudinal view of an apparatus with inclined position of the stirrers; and FIG. 3 is a cross sectional view of the embodiment of FIG. 2 along line III—III. Referring to the drawings:

In FIG. 1 a cylindrical vessel (1) with horizontal axis is subdivided into 7 chambers by 6 vertical partition walls. Each wall leaves blank the lower tenth (3) of the cross sectional area of the vessel. In each chamber a stirrer (4) is mounted carrying a stirring element (5) at the lower end which is completely covered by the dispersion and the lower edge of which has a distance from the bottom of the vessel which is equal to 15% of the internal diameter of the vessel. In the upper part of each chamber the shaft of the stirrer carries an axial flow blower (6) for a good mixing of the gaseous phase. At one end the vessel has an opening each for the supply of the dispersion (7) and the discharge of gas (8) and at the opposite end an opening each for the discharge of the dispersion (9) and the supply of gas (10). At the bottom each chamber is provided with an opening through which cold water can be supplied through tubes (12).

The carrier gas is passed from one chamber to the other by external pipes (11) with regulable cross section (11a).

The vessel is further provided with a liquid level indicator (14) and surrounded by a jacket (not shown) through which a heating medium circulates and which is isolated externally against the dissipation of heat.

In FIG. 2 the horizontal cylindrical vessel (1) is subdivided into 4 chambers by 3 vertical partition walls (2) which leave blank the lower part (3) of the cross sectional area of the vessel. The stirrers (4), carrying stirring elements (5) at the lower end, are passed excentrically through the wall of the vessel from the side. Each chamber has a gas passage (13) ending directly above the liquid level and having a cross section such that the gas issues at a speed of at least 2 m/sec, whereby an intense mixing of the gaseous phase without mechanical means is ensured.

The latter mode of construction is preferred for degassing vessels of large dimensions as the lateral insertion of the stirrer is more advantageous.

The following examples illustrate the invention. The indicated measuring values were determined as follows:

Residual vinyl chloride content: by gas chromatography according to the "head-space" method (Zeitschrift für analytische Chemie 255 (1971), pages 345 to 350).

Average particle size: according to DIN 53 734, evaluation with the granulation screen according to Rosin-Ramler; in the case of fine-grained polymers by counting the particles in different classes with the aid of exposures of an electron microscope as described in Chemie Ingenieur-Technik 43 (1971), page 1030.

Plasticizer absorption: filter papers are placed into two beakers with perforated bottoms in a centrifuge, 2 g polyvinyl chloride are weighed in and 10 ml di(ethylhexyl)-phthalate are poured over the polymer. Possible differences in weight between the two beakers are compensated on a balance with further amounts of di(ethylhexyl)-phthalate. The beakers are centrifuged for 10 minutes at 10,000 revolutions per minute and the increase in weight of the polyvinyl chloride is determined in percent, calculated on the polymer weighed in.

The thermal damage was determined visually by evaluating the degree of coloration of the polymer powder.

Examples 1, 5, 7 and 10 according to the invention were carried out in an apparatus as shown in FIG. 1 consisting of a pressure resistant horizontal and cylindrical vessel having a capacity of 12 liters, which was isolated against the loss of heat and subdivided by 5 partition walls into 6 chambers of equal size. In the lower part of the vessel the partition walls left blank 15% of the total cross sectional area of the vessel. Each of the 6 chambers contained a propeller stirrer with downward conveyance mounted closely above the bottom of the vessel and rotating at a circumferential speed of 5 m/sec. The dispersion to be degassed was continuously supplied at one end of the vessel near the bottom and discharged at the opposite end near the bottom.

As treating gas steam of 150° C. was passed from chamber to chamber in countercurrent flow to the dispersion through tubes, the cross sections of which having a size such that the steam flowed into the respective chamber at a speed of about 5 m/sec. and permanently formed an eddy current in the gas space. All gas inlets were positioned above the liquid level. With the aid of the liquid level indicator the supply and discharge of the dispersion was adjusted to obtain the residence times indicated in the table.

In the vessel the temperature of the dispersion was measured, it remained practically constant during the course of the treatment. In most of the examples the pressure in the vessel corresponded to atmospheric pressure. In Example 10 it was maintained at 380 mm Hg.

Example 2 and the second part of Example 10 were carried out in an analoguous vessel having a capacity of 20 liters and subdivided into 10 approximately equal chambers by 9 partition walls.

Comparative Examples 3, 8 and 11 were carried out continuously in a known apparatus consisting of a pressure resistant horizontal vessel isolated against the loss of heat and having a capacity of 12 liters which was subdivided into 6 approximately equal compartments by 5 weirs covering the lower portion and leaving blank the upper 50% of the cross sectional area of the vessel. Each of the compartments was equipped with a multistage-impulse-countercurrent stirrer rotating at a circumferential speed of 1 m/sec and had a gas inlet at the bottom. The dispersion was supplied continuously at one end of the vessel, the compartments were successively filled completely and the dispersion was discharged at the opposite end of the vessel. The inlet and outlet were regulated to obtain the residence times indicated in the table. Steam of 150° C. was blown into the compartments at the bottom and discharged from the common gas space of the vessel. A considerable foam formation was observed in the first compartments in the direction of flow of the dispersion, which caused difficulties after a short time of operation so that an anti-foaming agent had to be added in order that the experiment could be completed.

Comparative examples 4, 6, 9 and 12 were carried out discontinuously in a 2 liter pressure resistant vessel isolated against the loss of heat and equipped with a propeller stirrer rotating at a circumferential speed of 1 m/sec. Steam of 150° C. was supplied at the bottom of the vessel. At the beginning of the treatment the dispersion started to foam so that an anti-foaming agent had to be added.

In all examples the temperature of the dispersion in the vessel was measured, it remained substantially constant. In most of the examples the pressure corresponded to atmospheric pressure, in comparative Examples 11 and 12 it was maintained at 380 mm Hg.

Examples 1 and 2 according to the invention and comparative Examples 3 and 4 were carried out with an aqueous vinyl chloride homopolymer dispersion obtained by suspension polymerization and having a polymer content of 33%, a K value of the polymer of 55, an average particle size of 85μ and a plasticizer absorption of 10.3%.

Example 5 according to the invention and comparative Example 6 were carried out using an aqueous vinyl chloride homopolymer dispersion obtained by suspension polymerization and having a polymer content of 30%, a K value of the polymer of 70, an average particle size of 105μ and a plasticizer absorption of 28%.

In Examples 7 and 10 according to the invention and in comparative Examples 8, 9, 11 and 12 an aqueous vinyl chloride-vinyl acetate copolymer dispersion prepared by suspension polymerization and having a polymer content of 35%, a K value of the polymer of 60, an average particle size of 85μ and a plasticizer absorption of 8.6% was used.

The values obtained are listed in the following table in which the comparative examples are marked by the letter c besides the number.

What is claimed is:

1. A process for continuously removing vinyl chloride monomer from an aqueous polymer dispersion whose polymer portion contains at least 50% by weight of polymerized vinyl chloride so as to obtain a residual vinyl chloride monomer content of 10 ppm or less, said process comprising the steps of passing the dispersion in one direction through the lower regions of at least two serially arranged chambers, passing a gas which does not react with the dispersion through the upper regions of said serially arranged chambers in a direction opposite to the passage of polymer dispersion so as to contact the upper surface of the dispersion in each chamber with said gas without passing said gas through said dispersion, and maintaining the upper surface of the dispersion in said chambers in motion in the direction of the boundry surface between the dispersion and the gas, said motion being radial relative to a point on the surface of said dispersion and having a speed of 0.3 to 10 m/sec.

2. A process as claimed in claim 1 wherein the gas is discharged only from the last chamber in the direction of the gas.

3. A process as claimed in claim 1 wherein the chambers are positioned one beside the other and separated by partition walls, the dispersion being passed through an opening at the bottom of the partition wall between adjacent chambers.

4. A process as claimed in claim 1 wherein said motion has a speed of 0.5 to 2 m/sec.

5. A process as claimed in claim 1 wherein the dispersion is treated in 3 to 21 chambers.

6. A process as claimed in claim 1 wherein the dispersion is heated prior to or during removal of vinyl chloride monomer from the aqueous polymer dispersion.

7. A process as claimed in claim 1 wherein steam or super-heated steam is employed as said gas.

8. A process as claimed in claim 1 wherein the dispersion is treated in 5 to 11 chambers.

| | no. | stages | temp. °C. | mm Hg [3] | Content of dispersion (ppm) VC at inlet | Content of dispersion (ppm) VC at outlet | residence time (min) | steam[1] kg/kg polymer | thermal damage |
|---|---|---|---|---|---|---|---|---|---|
| VC-suspension homopolymer K=55 | | 6 | | | | 10 | 11.5 | 10 | no |
| | 1 | 6 | 99 | 757 | 1100 | 1 | 17.5 | 14 | no |
| | 2 | 10 | 99 | 761 | 12000 | 6 | 22 | 15 | no |
| | | 6 | | | | 100 | 17.5 | 10 | no |
| | 3c | 6 | 99 | 759 | 1100 | 10 | 35 | 20 | yes |
| | | 1[2] | | | | 10 | 15 | 10 | no |
| | 4c | 1[2] | 99 | 757 | 1100 | 1 | 30 | 20 | starting |
| VC-suspension homopolymer K=70 | 5 | 6 | 99 | 756 | 12000 | 1 | 5 | 7 | no |
| | 6c | 1[2] | 99 | 759 | 12000 | 10 | 5 | 7 | no |
| VC-VAc-suspension copolymer K=60 | 7 | 6 | 99 | 760 | 2300 | 10 | 5 | 10 | no |
| | 8c | 6 | 99 | 758 | 2300 | 10 | 30 | 20 | yes |
| | 9c | 1[2] | 99 | 758 | 2300 | 10 | 7 | 10 | no |
| | 10 | 6 | | | 1800 | 10 | 30 | 10 | no |
| | | 10 | 80 | 380 | 1800 | 1 | 60 | 10 | no |
| | 11c | 6 | | | 1800 | 10 | 300 | 50 | yes |
| | | 6 | 80 | 380 | 1800 | 1 ppm | cannot be reached owing to thermal damage | | |
| | 12c | 1[2] | | | 1800 | 15 | 60 | 10 | no |
| | | 1[2] | 80 | 380 | 1800 | 1 | 180 | 30 | yes |

[1] without steam used for heating the dispersion
[2] discontinous operation
[3] calculated on sea level